United States Patent [19]

Seiffert et al.

[11] Patent Number: 5,787,409

[45] Date of Patent: Jul. 28, 1998

[54] DYNAMIC MONITORING ARCHITECTURE

[75] Inventors: Roland Seiffert, Morgan Hill; Stan Wong, San Jose, both of Calif.

[73] Assignee: International Business Machines Corporation, Armonk, N.Y.

[21] Appl. No.: 650,900

[22] Filed: May 17, 1996

[51] Int. Cl.$^6$ .................................................. H04L 12/26
[52] U.S. Cl. ........................ 706/45; 706/48; 706/916; 364/550
[58] Field of Search ................. 395/183.02, 64, 395/10, 11, 50, 60, 916; 364/550, 551.01

[56] References Cited

U.S. PATENT DOCUMENTS

| | | | |
|---|---|---|---|
| 4,649,515 | 3/1987 | Thompson et al. | 395/61 |
| 4,754,410 | 6/1988 | Leech et al. | 395/51 |
| 4,939,680 | 7/1990 | Yoshida | 395/11 |
| 5,012,430 | 4/1991 | Sakurai | 395/11 |
| 5,051,932 | 9/1991 | Inoue et al. | 395/11 |
| 5,107,497 | 4/1992 | Lirov et al. | 395/183.02 |
| 5,165,011 | 11/1992 | Hisano | 395/11 |
| 5,193,143 | 3/1993 | Kaemmerer et al. | 395/51 |
| 5,283,856 | 2/1994 | Gross et al. | 395/50 |
| 5,303,332 | 4/1994 | Kirk et al. | 395/60 |
| 5,313,561 | 5/1994 | Nishizawa et al. | 395/61 |
| 5,355,444 | 10/1994 | Chirico | 395/50 |
| 5,367,473 | 11/1994 | Chu et al. | 364/551.01 |
| 5,404,503 | 4/1995 | Hill et al. | 395/575 |
| 5,412,802 | 5/1995 | Fujinami et al. | 395/575 |
| 5,448,722 | 9/1995 | Lynne et al. | 395/53 |
| 5,463,545 | 10/1995 | Umeda et al. | 364/187 |
| 5,513,343 | 4/1996 | Sakano et al. | 395/183.02 |
| 5,545,186 | 8/1996 | Olson et al. | 607/14 |
| 5,566,339 | 10/1996 | Perholtz et al. | 395/750.08 |
| 5,598,511 | 1/1997 | Petrinjak et al. | 395/50 |
| 5,619,621 | 4/1997 | Puckett | 395/50 |
| 5,621,663 | 4/1997 | Skagerling | 364/550 |
| 5,644,686 | 7/1997 | Hekmatpour | 395/50 |
| 5,649,185 | 7/1997 | Antognini et al. | 395/609 |
| 5,729,472 | 3/1998 | Seiffert et al. | 364/550 |

OTHER PUBLICATIONS

L. Gasser, "A Multi-Agent Intelligent Diagnostic System," Proc. Western Conf. on Expert Systems, pp. 203-208, Jun. 1987.

B. Samadi, "TUNEX: A Knowledge-Based System for Performance Tuning of the UNIX Operating System," IEEE Trans. on Software Engineering, vol. 15(7), pp. 861-874, Jul. 1989.

M. Pfau-Wagenbauer and Nejdl, "Integrating Model-Based and Heuristic Features in a Real-Time Expert System," IEEE Expert, pp. 12-18, Aug. 1993.

U.M. Schwuttke, et al., "Cooperating Expert Systems for the Next Generation Real-time Monitoring Applications," Proc. Int'l. Conf. on Expert Systems for Development, pp. 210-215, Mar. 1994.

U.M. Schwuttke and A.G. Quan, "Enhancing Performance of Cooperating Agents in Real-time Diagnostic Systems," Proc. Thirteenth Int'l. Joint Conf. on Artificial Intelligence, pp. 332-337, Dec. 1993.

*Primary Examiner*—Robert W. Downs
*Attorney, Agent, or Firm*—Sughrue, Mion, Zinn, Macpeak & Seas, PLLC

[57] ABSTRACT

A dynamic monitoring system for monitoring a computer system. The monitoring system is based on an optimized distributed policies or rules evaluation knowledge-base for monitoring the current state and conditions of the computer system in real-time. The monitoring system is further designed to monitor and dynamically reconfigure itself in real-time, based on the changing state and conditions of the computer system being monitored. The dynamic monitoring system continuously changes and adjusts to the present state of the computer system.

18 Claims, 6 Drawing Sheets

|     | CHK#1 | CHK#2 | CHK#3 |
|-----|-------|-------|-------|
| 3A. | X     | X     | X     |
| 3B. | N     | X     | X     |
| 3C. | X     | N     | X     |
| 3D. | N     | N     | X     |
| 3E. | X     | X     | N     |
| 3F. | N     | X     | N     |
| 3G. | X     | N     | N     |
| 3H. | N     | N     | N     |

"N" DENOTES NEW CHECK VALUE REQUIRED.
"X" DENOTES DON'T CARE.

FIG. 3

DYNAMIC MONITORING ARCHITECTURE

BACKGROUND OF THE INVENTION

The present invention is directed to a dynamic monitoring system for monitoring a computer system. More particularly, the present invention is directed to a method and apparatus of monitoring a computer system, based on an optimized distributed policies or rules evaluation knowledge-base, in which the policies or rules, which monitor the computer system, dynamically reconfigure the monitoring system to adjust to the present state of the computer system in real-time.

Complex computer systems of the type known in the art are generally constituted by several subsystems, which include, for example, various types of computer networks, computer workstations and/or mainframes, each running its own operating system and application and database software. It is also known that such complex systems require at least one individual, referred to as the system administrator, to control and manage the computer system including each of the subsystems on a daily basis, to ensure the efficient and smooth operation of the system. As computer systems become larger and more complex, they tend to require even more attention and time to ensure proper operation.

The management of such complex computer systems includes both online administrative tasks and offline monitoring tasks. These tasks include initializing or configuring the computer system's operating system, databases and other applications present on the computer system. As an example, online administrative tasks include initializing a new user's account, such as the user identification (userid) and password, allocating additional storage space for existing databases or other types of applications, installing new applications onto the computer system, and so on. Offline monitoring tasks include, for example, observing the number of user's logon'd to the computer system, or the CPU utilization or storage space available at any given moment. There are, of course, many other administrative and monitoring tasks that a system administrator is required to perform—all of which are known and within the skill of the ordinary artisan.

Oftentimes, the subsystems which constitute a computer system are physically located at the same site (e.g., within the same office building). In this case, it is not uncommon to have one system administrator manage and control the computer system. More commonly today, however, subsystems are not located at the same site, but are variously situated at different locations, including, in some instances, different cities or even states. A bank, for example, having a number of branch offices may have a computer subsystem located at the bank's headquarters and variously throughout a state at each of the branch offices. Ideally, there is a system administrator located on site for each of the subsystems. However, this proves to be quite expensive. On the other hand, as an alternative, there may be only one system administrator for the entire computer system. The system administrator would have to travel from one site to the next in order to carry out his/her functions. This is also disadvantageous as it requires a substantial amount of time to travel between different locations, significantly reducing the amount of time the system administrator has to spend with each system. Moreover, when users of the computer system require immediate assistance, they must often wait until the system administrator is able to travel to the site and attend to the problem. This is not acceptable.

To overcome these and other problems associated with computer systems as described above, a control system has been developed. The control system allows a system administrator to manage (i.e., perform the administrative and monitoring tasks) a computer system, including its many subsystems variously located, from one central site. In such a case, the central site includes a workstation that is capable of communicating with each of the subsystems systems via a communication link, allowing the administrator to perform both the online administrative tasks and offline monitoring tasks, as if he/she were physically located at the remote location.

As part of the monitoring tasks, the system administrative has the ability to monitor various types of parameters from the central site. For example, the system administrator may wish to monitor the amount of storage space available at each of the managed systems. To do so, a command is issued from the central site to the managed system, with an instruction to monitor the storage space available and to send the results back to the central site for evaluation and analysis, on a timed basis, such as every 10 or 15 minutes. The result (e.g., the amount of storage space available) may then be compared to a preset threshold, and then acted upon by the monitoring system. For example, if the amount of storage space available is less than a preset threshold, the system will initiate a reorganization of the storage space in an attempt to free additional space. Alternatively, the system may be programmed to notify the system administrative through some sort of an alarm. The system administrator may then take the steps necessary to avoid any problem.

A monitoring system as defined above is known as a static monitoring system, because once the system is defined or programed by the user or system administrator, it does not change. In general terms, a static monitoring system employs a fixed set of checks and rules to evaluate the state of the computer system and to take appropriate actions. Once set, the checks and rules programmed by the system administrator do not change, even though the status and condition of the computer system is constantly changing.

Moreover, under certain conditions, the monitoring system becomes a considerable burden on the computer system's resources. For instance, consider the following example. A check is defined to measure the available space of a table. A rule is defined to reorganize the table if the available space drops below a predetermined threshold. In some situations, the reorganization of the table frees enough space, while in others the reorganization has practically very little, if any, effect. In the latter situation, the static monitoring system will continue repeatedly to execute the reorganization of the table attempting to free space, even though this process is ineffective. The fact that the reorganization is repeatedly executed results in valuable resources of the computer system being consumed; sometimes bringing the computer system to a halt. This is unacceptable.

The fact that a static monitoring systems employs a fixed set of checks and rules to evaluate the state of the computer system leads to further limitations and thus disadvantages. For example, a static monitoring system may employ several checks to monitor the status of a database application. The checks may include how many users are using the database, how much storage space is available for the table space of the database, what is the CPU utilization of the database, what is the number of current locks held against this database, and so on. In a static monitoring system, each of these checks will be executed on a periodic basis, irrespective of whether the database is even available or running. When the database is available, these checks provide useful information to the system administrator. However, when the database is not running, these checks are of no value, and result in burdening the computer system and its resources with unnecessary monitoring. This presents a major problem with static monitoring system.

SUMMARY OF THE INVENTION

Accordingly, it is a general object of the present invention to provide a dynamic monitoring system, which is free of the above and other problems of the related art.

Another object of the present invention is to provide a dynamic monitoring system having the ability to monitor and reconfigure itself in real-time, based on the current state and conditions of the computer system being monitored.

It is a further object of the present invention to provide a dynamic monitoring system that is adaptable to focus its resources to particular areas and problems detected (e.g., space available) of a computer system. According to the present invention, if a problem is detected within the computer system, the dynamic monitoring system has the ability to reconfigure and focus itself to investigate further, through the implementation of further monitoring routines. Under normal operating conditions, these further monitoring routines would not be implemented, thereby reducing the load on the computer system.

According to further objects of the present invention, there is provided a dynamic monitoring system in which a minimal amount of monitoring is performed when the computer system is diagnosed as being "healthy." Accordingly, the impact on the performance of the computer system by the dynamic monitoring system is substantially reduced.

A further object of the present invention is to provide a dynamic monitoring system having a series of layers of watchdog checks and rules. Under normal operations, only the first layer is activated. However, as problems are detected, the dynamic monitoring system activates additional layers to monitor additional characteristics of the computer system in order to diagnose the problem.

The above and other objects of the present invention are accomplished by providing a dynamic monitoring system for monitoring status and conditions of a computer system. The dynamic monitoring system includes means for defining one or more watchdog checks, each defining a predetermined characteristic of the computer system to be monitored, and one or more watchdog rules, each defining a condition to be evaluated based on one or more of the watchdog checks, monitoring means, responsive to the watchdog checks, for monitoring the predetermined characteristics of the computer system, and comprises means for producing check values representative of the status of the predetermined characteristics of the computer system, rule evaluation means, responsive to the one or more watchdog rules and at least one of the check values, for evaluating at least one of the watchdog rules based on the at least one check value and for producing an evaluation result, and altering means, responsive to the evaluation result, for dynamically altering the rule evaluation means in real-time, based on the evaluation result, to adapt the dynamic monitoring system to the status and conditions of the computer system.

The above and other objects of the present invention are further provided by a dynamic monitoring system for monitoring status and conditions of a computer system. The dynamic monitoring system includes means for defining a plurality of watchdog checks, each defining a predetermined characteristic of the computer system to be monitored, and a plurality of watchdog rules, each defining a condition to be evaluated based on one or more of the watchdog checks, wherein a first monitoring group is constituted by a first predetermined number of watchdog checks and rules, and a second monitoring group is constituted by a second predetermined number of watchdog checks and rules, and monitoring means, responsive to the first and second monitoring groups of watchdog checks and rules, comprising first means for monitoring the computer system in accordance with the first monitoring group, and for producing results representative of the status of the predetermined characteristics of the computer system, and second means, responsive to the results produced by the first means, for monitoring the computer system in accordance with the second monitoring group, when the results produced by the first means indicate a first predetermined condition of the computer system, the second means producing results representative of the status of the computer system.

The above and other objects of the present invention are even further accomplished by a method of dynamically monitoring a computer system. The method includes the steps of defining a knowledge base including one or more watchdog checks, each defining a predetermined characteristic of the computer system to be monitored, and one or more watchdog rules, each defining a condition to be evaluated based on one or more of the watchdog checks, monitoring the computer system in accordance with the knowledge base, and producing a result representative of a present status of the computer system, dynamically reconfiguring the knowledge base in accordance with the status of the computer system, so as to adapt the dynamic monitoring system to the present status of the computer system, and monitoring the computer system in accordance with the reconfigured knowledge base.

BRIEF DESCRIPTION OF THE DRAWINGS

FIGS. 3a–3h illustrate a manner of defining rules and checks utilized in a dynamic monitoring system, in accordance with the present invention.

DETAILED DESCRIPTION OF PREFERRED EMBODIMENTS OF THE INVENTION

Figure 1A:
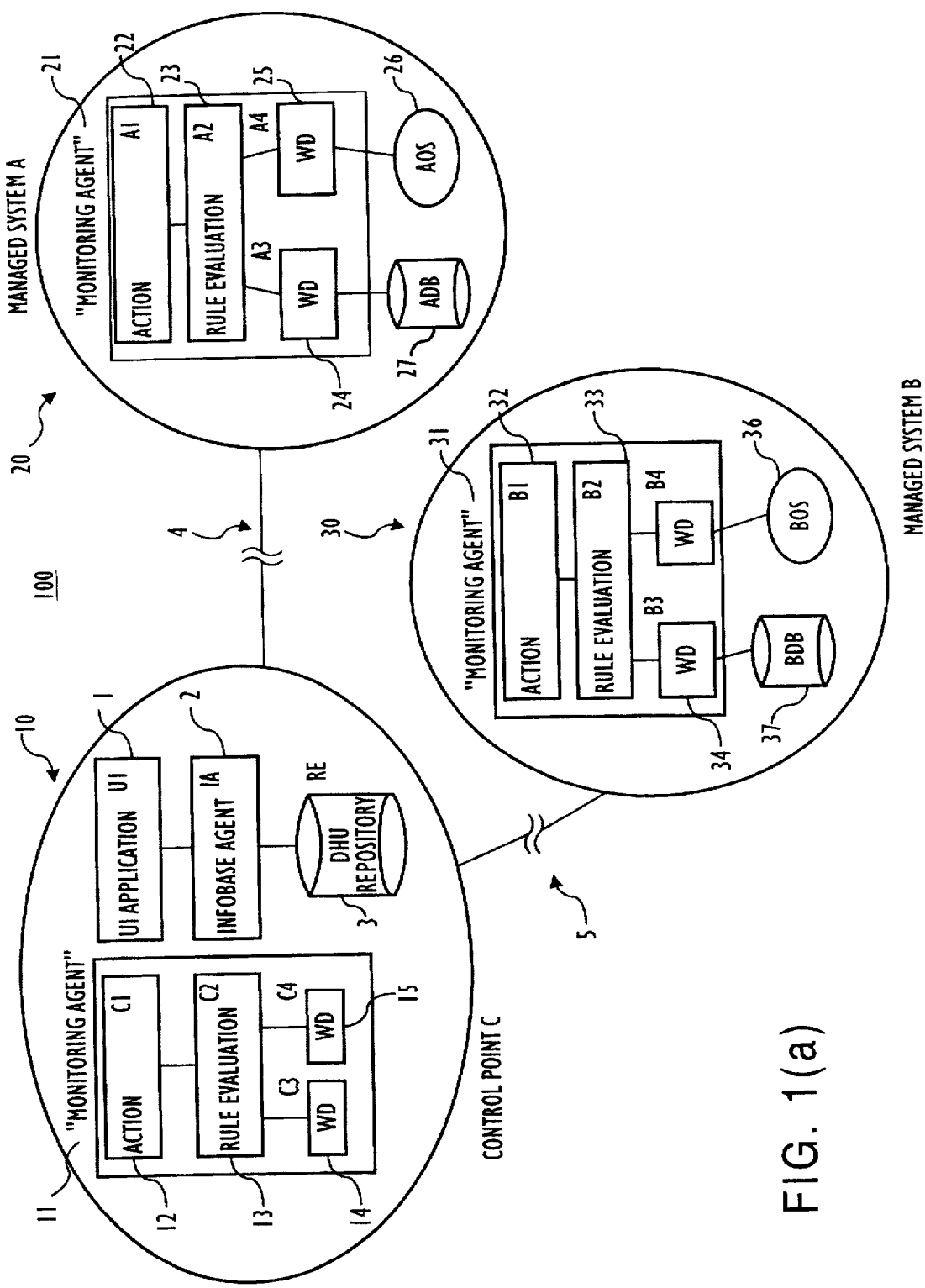
FIGS. 1a and 1b illustrate a computer system in accordance with first and second preferred embodiments, respectively, of the present invention.

In accordance with the present invention, FIG. 1a illustrates a computer system 100 having subsystems 10, 20, and 30. It should be noted that the number of subsystems shown is for the sake of illustration. The number of subsystems will vary, of course, ranging from a few (e.g., two to five) to perhaps several hundreds of subsystems, depending on the specific design of the computer system 100.

As illustrated in FIG. 1a, one of the subsystems is defined as the control point, while the remaining subsystems are defined as managed systems. In accordance with the preferred embodiment, the subsystem 10 is defined as control point C and subsystems 20, 30 are defined as Managed Subsystem A and Managed Subsystem B, respectively. It should be noted that the determination of which subsystem is the control point and which subsystems are the managed systems is based in part on the processing power available at each of the subsystems. That is, the subsystem 20 could be configured as the control point and the subsystem 10 could be configured as a managed system. The determination of which subsystem serves as the control point is one of design, based on resources available and other conveniences.

The subsystem 10 at control point C includes a user interface 1, an infobase agent 2, and a database repository 3. The user interface 1 is constituted by a workstation having, as an example, a keyboard and graphical interface (not shown) for allowing the user of the system to interact with the system. As explained more fully below, the user interface 1 is the point at which the user or system administrator is able to administer and monitor the computer system 100, including the subsystem 10 at control point C and each of the managed systems 20, 30. The infobase agent 2 is coupled to the user interface 1. The infobase agent is operative to receive and process commands entered into the system by the system administrator. As explained below more fully, the infobase agent 2 directs commands via messages to the various managed systems. Lastly, the database repository 3 stores pertinent information concerning the computer system 100 as a whole. For example, the repository stores data relating to the topology of the complete computer system, as well as information concerning the types of operating systems, databases, and other applications existing on each of the subsystems 10, 20, 30. The repository further stores information pertaining the offline monitoring of the computer system, in accordance with the present invention.

The subsystem 10 at control point C further includes, like all of the subsystems, a monitoring agent 11. The monitoring agent 11 includes an action agent 12, a rule evaluator module 13, and watchdog agents 14, 15. In a known manner, the control point 10 is coupled to each of the managed systems 20, 30 through communication links 4,5, which may be constituted by non-dedicated or dedicated telephone lines or communication links having an even higher bandwidth. The communication links 4, 5 provide a mechanism for the control point 10 to communicate with each of the managed systems, in order to carry out, among others, the administrative and monitoring tasks.

The subsystem 20 at Managed System A includes, as examples, an operating system AOS 26 and database ADB 27. As is known in the art, all computer systems require some sort of operating system (e.g., UNIX) to initialize, configure and control the computer system. The database ADB 27 is one type of application that resides on the subsystem 20. As is well-known in the art, a database is constituted by a collection of data with a given structure for accepting, storing, and providing data in various forms for multiple users on demand. In a typical setting, the subsystem 20 at Managed System A would have additional applications available. The subsystem 20 further includes a monitoring agent 21. Like the monitoring agent 11, the monitoring agent 21 includes an action agent 22, a rule evaluator module 23, and watchdog agents 24, 25.

The subsystem 30 at Managed System B is configured similarly to the subsystem 20. Specifically, the subsystem 30 includes an operating system BOS 36 and database BDB 37. According to the present invention, the operating system 36 residing on subsystem 30 need not be the same as or even similar to the operating system 26 that resides on subsystem 20. The same is true for the databases ADB 27 and BDB 37, or any other types of applications which operate on the subsystem 20.

The subsystem 30 further includes a monitoring agent 31 which is constituted by the same components as the monitoring agents 11 and 21, as described above. Thus, the monitoring agent 31 includes an action agent 32, a rule evaluator module 33, and watchdog agents 34, 35.

In accordance with the present invention, the monitoring agents 11 and 21, 31 provide the system administrator the ability to monitor the computer system 100, including the subsystem 10 at control point C and each of the subsystems 20, 30 at Managed Systems A and B through the use of watchdogs. A watchdog, sometimes referred to as an intelligent agent, is a process, which operates on one of the watchdog agents, for providing offline monitoring of the operating systems, databases, and other applications. A watchdog is specific to run-time environments (operating systems and databases). For example, a UNIX operating system is monitored by an operating system watchdog specific to UNIX. The system administrator, via the user interface 1 and infobase agent 2, programs the watchdog agents with one or more conditions to monitor (referred to as watchdog checks). The watchdog check has the following components: filter values, scheduling information, the command to execute, and instructions on whether or not to store the check values.

In addition, the system administrator programs the rule evaluator modules 13, 23, 33, via the user interface 1 and infobase agent 2, with one or more watchdog rules. A watchdog rule is a condition or set of conditions evaluated based on the values returned by one or more watchdog checks. Each of the watchdog rules defines acceptable limits for the condition or conditions and specifies an action to be taken if the conditions are met. The action(s) specified by the rule evaluator is carried out by at least one of the action agents 12, 22, 32.

In operation, administration and monitoring of the computer system, including both of the subsystems 20, 30, as illustrated in FIG. 1 and described above, are performed by the system administrator on the subsystem 10 at the control point C. According to one feature of the present invention, the system administrator need not be physically located at either Managed System A or Managed System B.

The system administrator has the ability to perform administrative tasks on-line via the user interface 1. More specifically, via the user interface 1, the system administrator enters commands through the selection of icons by a pointing device and a keyboard (not shown) in order to execute administrative tasks for each of the subsystems 10, 20, 30. Thus, for example, the system administrator can perform administrative tasks on the subsystem at Managed System A from the remote subsystem 10 located at the control point C.

The system administrator further has the ability to monitor not only the computer system as a whole, but each of the individual subsystems, such as those located at the Managed Systems A and B sites and the subsystem 10 at the control point C. The monitoring functions are all defined via the user interface 1, as will now be described in detail.

More specifically, the system administrator defines one or more watchdog checks by entering appropriate commands by selecting an icon with a pointing device or through a keyboard of the user interface 1. Once a watchdog check is defined by the system administrator, it is passed to the infobase agent 2 and stored in the data repository 3. The infobase agent 2 determines automatically the subsystem which should receive the newly defined watchdog check. This decision is based on which entity is being monitored. For example, if the database ADB 27 is being monitored, the watchdog check will be transferred to the watchdog agent 24. The watchdog check is then transferred to the appropriate subsystem by sending a message to that subsystem over a communication link. At the subsystem receiving the watchdog check, the watchdog agent is configured to begin execution of the watchdog check.

Next, the system administrator may define one or more watchdog rules, each of which evaluates one or more watchdog check values against a condition or set of conditions, and then initiates an action if the condition or set of conditions is satisfied. The system administrator also defines the action that is to be performed once the condition or set of conditions is satisfied.

Once a rule is defined by the system administrator, the user interface 1 transfers the rule to the infobase agent 2 for processing and updates the data repository 3 to add the newly defined rule. Next, the infobase agent 2 analyzes the newly defined rule and locates all of the watchdog checks upon which the rule is based. The watchdog rules are then distributed to the appropriate subsystem for processing by the rule evaluator module.

Figure 1B:
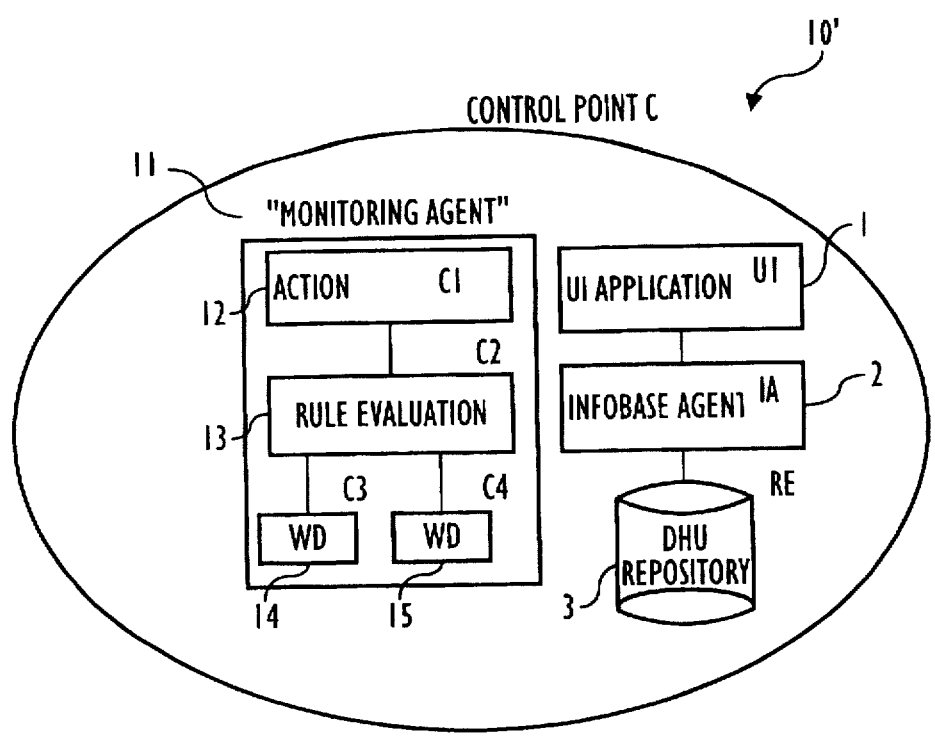

The present invention is not limited to a computer system as illustrated in FIG. 1a. In further accordance with the present invention, FIG. 1b illustrates a second embodiment of the computer system. As shown, the computer system 100 includes one subsystem. Like reference numerals in FIG. 1b correspond identically to the components illustrated in FIG. 1a. Similar to the subsystem 10 as illustrated in FIG. 1a, the subsystem 10' includes a monitoring agent, an interface unit, infobase agent, and a data repository. The system 10' is self-contained without the additions of remote subsystems. The computer systems according to the first and second embodiments of the present invention, incorporate a dynamic monitoring system as will now be fully described.

In accordance with the present invention, the monitoring system as described above is dynamic, meaning that it has the ability to monitor and reconfigure itself in real-time based on the current state or condition of the computer system being monitored. As a result, the dynamic monitoring system is capable of adapting to the ever-changing state and/or condition of the computer system. Such a system, as described herein, is often referred to as an expert system, because it is capable of reasoning about itself and self-modification (i.e., reconfiguring) to adapt to the current state of the computer system.

The dynamic monitoring system is initially defined by the system administrator to include watchdog rules and checks which refer to the state or condition of the monitoring system, including the results of other defined watchdog rules and checks. The system administrator has the option of activating and deactivating (i.e., suspending) certain watchdog rules and checks, and placing "guards" on watchdog rules. A guard defines certain conditions, which must be satisfied, in order for the watchdog rule to be considered.

Figure 2A:
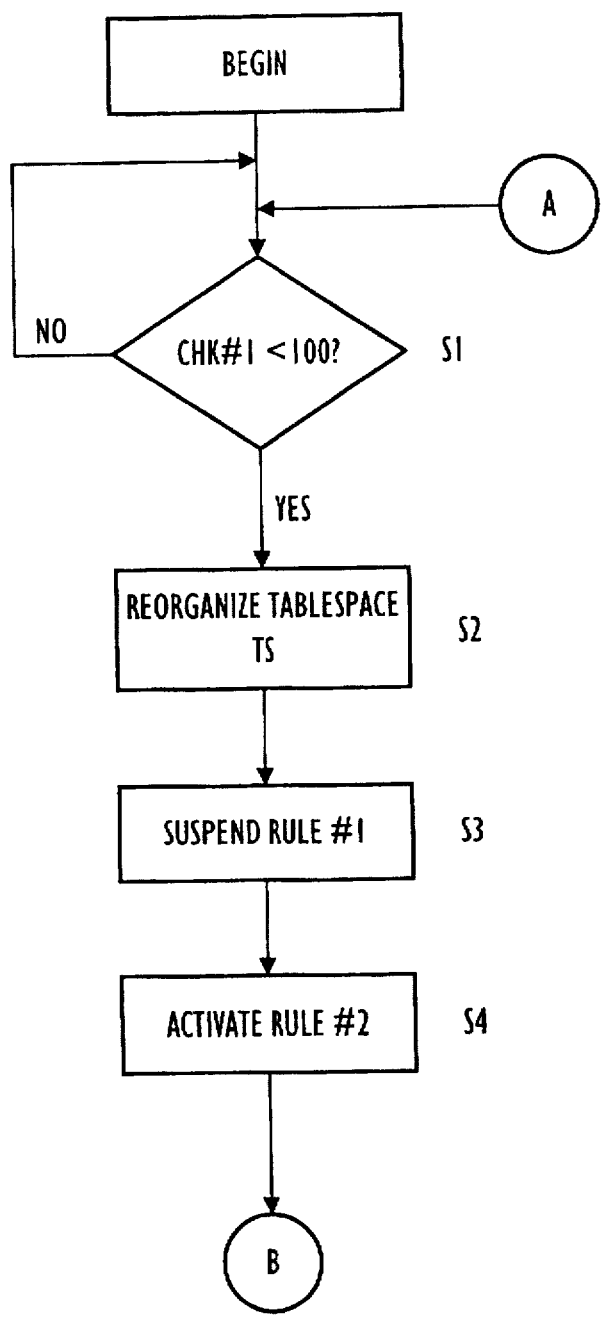
FIGS. 2a and 2b illustrate flow charts representing a set of rules utilized in a dynamic monitoring system, in accordance with the present invention.
Figure 2B:
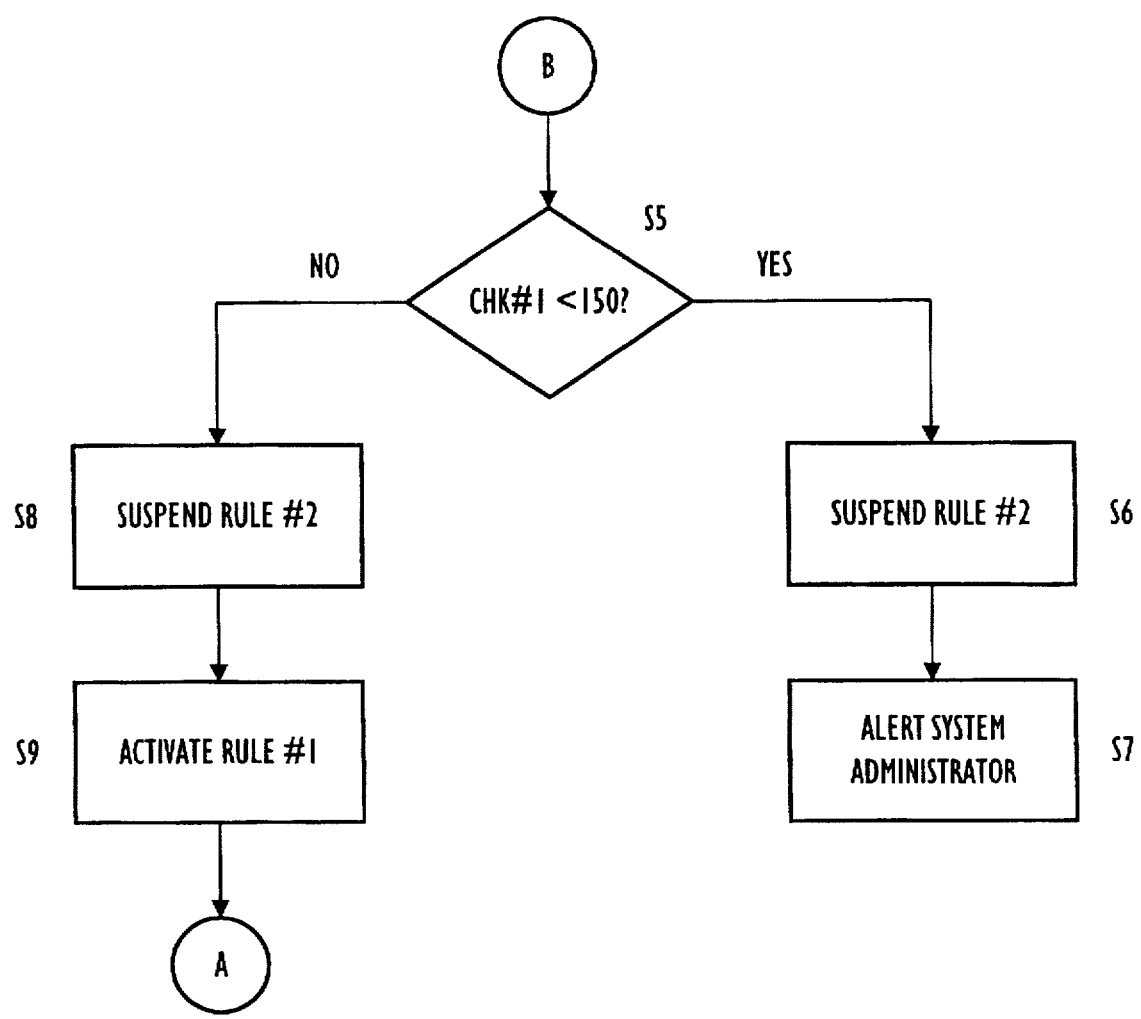

FIGS. 2a and 2b collectively illustrate an example of the dynamic monitoring system reconfiguring itself, based on the amount of table space available in a certain database application. The example illustrated is based on the definition of one watchdog check CHK#1 and two watchdog rules RULE#1 and RULE#2. The watchdog check CHK#1 is defined as a command to monitor the amount of free space (kB) in table space TS, and to return a corresponding value.

Referring to FIG. 2a, a flow chart illustrates the definition of the first watchdog rule RULE#1, which is based on the value returned by the first watchdog check CHK#1. In step S1, the value returned by the check CHK#1 is compared to a first threshold, e.g., 100. If the value is greater than 100, meaning that a sufficient amount of table space TS is available, the process returns back to step S1 and re-evaluates the next value returned by the watchdog check CHK#1. If, on the other hand, the value is less than 100, indicating that an insufficient amount of table space TS is available, then the process proceeds to step S2. In step S2, the action module is triggered to begin a reorganization of the table space TS, in an attempt to free additional table space. Next, in step S3, the first watchdog rule RULE#1 is suspended or deactivated, and in step S4, the second watchdog rule RULE#2 is activated.

FIG. 2b is a flow chart illustrating the definition of the second watchdog rule RULE#2. In step S5, the value returned by the check CHK#1 is compared to a second threshold, e.g., 150. If the value is less than 150, the process proceeds to steps S6 and S7. At step S6, the second watchdog rule RULE#2 is suspended, and, in step S7, an alert is triggered to the system administrator signifying that the reorganization of the table space TS did not free enough space. On the other hand, if the value is greater than the set threshold of 150, then the process proceeds from step S5 to steps S8 and S9. In steps S8, the second watchdog rule RULE#2 is suspended. In step S9, the first watchdog rule RULE#1 is re-activated. The process then implements watchdog rule RULE#1, as illustrated in FIG. 2a.

The above example illustrates the dynamic nature and intelligence of the monitoring system in accordance with the present invention. Initially, the watchdog rule implemented (i.e., RULE#1) evaluates the first watchdog check to a predetermined threshold. If the results of the evaluation indicate that the amount of free space measured is below a first threshold, then a reorganization of the table space TS is initiated. In addition, unlike conventional systems, the first watchdog rule RULE#1 suspends itself and initiates or activates a second rule, watchdog rule RULE#2. The second watchdog rule RULE#2, in turn, monitors the effect of the reorganization of the table space TS and whether or not it has been successful. If the reorganization results in a minimal amount of additional table space TS, the second watchdog rule RULE#2 detects this condition and signals an alert to the system administrator for further action.

Contrasted with conventional static monitoring systems, the dynamic monitoring system in accordance with the present invention, overcomes situations in which the monitoring system itself hinders the operation of the computer system. That is, a static monitoring system in the example above would continue to execute the first watchdog rule RULE#1, regardless of whether or not the reorganization of the table space TS was effective. In most situations, the reorganization of the table space TS will result in additional free space, so that upon the next execution of the first watchdog rule RULE#1, based on an updated check CHK#1 value, reorganization will not be re-initiated. In other situations, however, the reorganization of the table space TS will not result in added table space TS (e.g., the value returned by the watchdog check CHK#1 remains less than 100), resulting in the reorganization operation being re-initiated. The re-initiation of the reorganization routine will likely have no further effect, but the static monitoring system is not intelligent enough to recognize the situation. Eventually, the monitoring system becomes a heavy burden on the resources of the computer system. Moreover, the system administrator will not be informed of any problem until it is too late.

According to a further aspect of the present invention, the dynamic monitoring system has the ability to configure itself by increasing and/or reducing the monitoring resources utilized, based on the status of the monitored entities. For example, the monitoring system can be defined to monitor certain characteristics of a database. The watchdog checks defined include:

CHK#1: Is the database available?

CHK#2: How many users are connected to the database?

CHK#3: What are the number of locks currently being held against the database?

CHK#4: How much free space is in the table space of the database?

CHK#5: How many roll back of transactions occurred since the database was started?

On the occasions when the database is not available, the dynamic monitoring system is intelligent such that watchdog checks CHK#2–CHK#5 are deactivated (i.e., suspended). At this time, only the watchdog check CHK#1 is activated in order to determine when, and if, the database becomes available. Once available, the watchdog checks CHK#2–CHK#5 are activated, along with any watchdog rules that depend exclusively on the watchdog checks CHK#2–CHK#5.

In a dynamic monitoring system, two watchdog rules RULE#1 and RULE#2 are defined in order to carry out the above processing.

RULE#1
  IF: CHK#1=Database Not Running
  THEN: Deactivate checks CHK#2–CHK#5 Suspend RULE#1 Activate RULE#2

RULE#2
  IF: CHK#1=Database Running
  THEN: Activate checks CHK#2–CHK#5 Suspend RULE#2 Activate RULE#1

According to this example, the dynamic monitoring system implements only certain resources (i.e., watchdog rules and checks) based on the availability of a database application. In contrast, a conventional static monitoring system would implement, at all times, both watchdog rules RULE#1 and RULE#2 and all five watchdog checks CHK#1–CHK#5, and hence waste valuable resources of the computer system.

According to yet another example of the dynamic monitoring system of the present invention, the system performs routine "health" checks, which monitor general conditions of the computer system, unless a problem is detected. Once a problem is detected, the monitoring system is reconfigured to explore detected problem and attempt to diagnose the problem for the system administrator. In addition, the monitoring system can take corrective action to rectify the problem, as will be explained below by the next example.

In certain instances, the response time of a particular application (e.g., a production system running a transaction processing TP application) is very critical to the smooth and efficient operation of not only the computer system, but the business as a whole. The response time must fall within a predetermined range in order to meet particular goals. Thus, the monitoring system is defined to monitor the response time. For example, the acceptable range of the response time is determined to be 1.0 seconds. The system is considered "healthy" if the response time is never greater than 3.0 seconds, and, on average, less than 1.0 seconds. Accordingly, the monitoring system defines a time probe as the first watchdog check CHK#1 in order to determine the response time of the computer system. The watchdog check CHK#1 is defined to probe every minute.

If the response time remains on average less than 1.0 second and never exceeds 3.0 seconds, then the "health" of the system is acceptable. However, if not, then further monitoring action is implemented to inquire as to why the response time has or is exceeding the set threshold. In this example, there are several reasons known why the response time may fall out of an acceptable limit. Accordingly, the following watchdog checks are defined to monitor these reasons. The watchdog checks include:

CHK#2: Deadlock situation in an underlying database.

CHK#3: Too man locks held in the application tables.

CHK#4: Too many interactive TP users.

CHK#5: Non-application processes (i.e., other system usage besides the core TP application) are consuming too much CPU time.

CHK#6: Application backup job is running.

Assuming that the response time falls out of the acceptable range, then the above watchdog checks CHK#2–CHK#6 are implemented to further diagnose the problem and report back to the system administrator. The system administrator, based on the information he/she derives from the monitoring system, can take appropriate action in an attempt to solve the problem. For example, the system administrator may cancel other less important jobs in an attempt to improve the response time. In addition, the monitoring system has the intelligent to take certain actions to rectify the problem. For example, if a backup job is slowing the response time, the monitoring system can reassign the backup job to a later time when the overall demand on the computer system is not as great or lower the priority of the backup job so that it consume much less computer resources.

The following set of rules together with the above-defined watchdog checks illustrate the above example.

RULE#1
  IF: CHK#1>3.0
  THEN: Warn Administrator "Response time>3.0" Activate CHK#2–CHK#6 Deactivate RULE#1 and RULE#2

RULE#2
  IF: AVG of CHK#1>1.0 over last 15 minutes
  THEN: Warn Administrator "Average response time>1.0" Activate CHK#2–CHK#6 Deactivate RULE#1 and RULE#2

RULE#3
  IF: CHK#3>0
  THEN: Alert Administrator "Deadlock situation in application database"

RULE#4
  IF: CHK#3>10
  THEN: Alert System Administrator "Too many locks held in application tables"

RULE#5
  IF: CHK#4>50
  THEN: Alert System Administrator "Too many (CHK#4) interactive TP users"

RULE#6
  IF: CHK#5>25%
  THEN: Alert System Administrator "Non-core applications consuming (CHK#5)% of CPU"

RULE#7
  IF: CHK#6=TRUE
  THEN: Alert System Administrator "Application backup job running"

In addition to the foregoing rules and checks, the dynamic monitoring system further includes additional layers of checks. Each layer of checks varies in terms of degree to which they monitor the computer system. That is, in general, the top layer executes general watchdog checks and rules to monitor the general "health" of the system. If the system appears to be operating in proper order, no further or additional checks are implemented. However, if a problem is detected, the dynamic monitoring system reconfigures to implement a second layer of watchdog rules and/or checks to probe further into the general area of where the problem was detected. In some instances, the second layer may diagnose the problem, or provide the system administrator with enough information that he/she is capable of solving the problem manually.

However, the dynamic monitoring system includes a third layer which examines the computer system in even greater detail than the first or second layers. Moreover, only certain watchdog checks and/or rules associated with the area where the problem was detected are activated.

The dynamic monitoring system is further operative to place a "guard" in front of a rule. A guard is expressed in standard boolean notation, and defines a condition under which a rule should be considered. For example, a watchdog rule, which is based on three watchdog checks, is evaluated only after a unique combination of the three watchdog checks returns a new value. In this example, the watchdog rule is defined as:

RULE
    GUARD STATEMENT
    IF: (CHK#1>100) and (CHK#2<3.0) and (CHK#3>25)
    THEN: PERFORM FUNCTION A The unique combination is defined in the guard statement by the system administrator. FIG. 3a–h illustrate the various combinations. The letters "n" and "x" denote whether or not the watchdog rule is to be evaluated when the watchdog check(s) returns a new value. Thus, in FIG. 3a, the letter "x" is denoted under each of the watchdog checks CHK#1, CHK#2, and CHK#3. Therefore, in the example of FIG. 3a, the watchdog rule is evaluated when any one of the three checks returns a new value. The guard statement would be a null statement.

FIG. 3b illustrates an example in which the watchdog rule is evaluated when only the watchdog check CHK#1 returns a new value. Here, the guard statement would be defined as "New CHK#1." Thus, when the watchdog check CHK#1 returns a new value, the watchdog rule will be evaluated, irrespective of whether or not watchdog checks CHK#2 and CHK#3 have recently been updated. That is, a new value for watchdog checks CHK#2 or CHK#3 will not cause the watchdog rule to be evaluated, and therefore an "x" (i.e., don't care) is noted.

FIG. 3c shows an example in which the watchdog rule is evaluated when the second watchdog check CHK#2 returns a new value, irrespective of whether checks CHK#1 or CHK#3 have. The examples of FIG. 3b, 3c and 3e represent the situation in which only one watchdog check value needs to return a new value to trigger an evaluation by the watchdog rule.

FIG. 3d shows an example in which a combination of watchdog checks CHK#1 and CHK#2 must return a new value in order for the watchdog rule to be evaluated. A new check value returned by watchdog check CHK#3 will not cause an evaluation of the watchdog rule. The combination of watchdog checks CHK#1 and CHK#2 is based on a boolean expression, such as an AND or OR operation. For example, the watchdog rule may be evaluated when both (i.e., an AND operation) checks CHK#1 and CHK#2 return a new value. Here, the guard statement would be defined as "New CHK#1 AND New CHK#2." As another example, the guard statement can be defined as "New CHK#1 OR New CHK#2" so that the watchdog rule is evaluated when either check CHK#1 or CHK#2 returns a new value. FIGS. 3f and 3g illustrated similar examples.

Lastly, FIG. 3h illustrates an example in which a combination of all three check values CHK#1, CHK#2, and CHK#3 must return a new value in order for the watchdog rule to be evaluated. As in the examples of FIGS. 3d, 3f and 3g, the combination of watchdog checks is based on a boolean expression. The guard statement would be defined based on all three watchdog checks.

In order to carry out the dynamic monitoring system, including for purposes of illustration the above examples, the watchdog rules conform to a general format. The general format is as follows:

GUARD expression#
    IF: CONDITION expression
    THEN: ACTION list
    ELSE: ACTION list The guard and ELSE statements are optional. If a guard statement is not present, it is interpretated as "true" meaning that the rule will be considered.

In addition, the guards and conditions will follow the same formal language and identical evaluation mechanism. The difference is only when they will be evaluated. More specifically, the evaluation of a guard or condition will result in one of three values, namely, "true," "false," or "unknown." The last case may occur, for example, if a condition refers to a watchdog check value which is yet to be received or generated.

Figure 4:
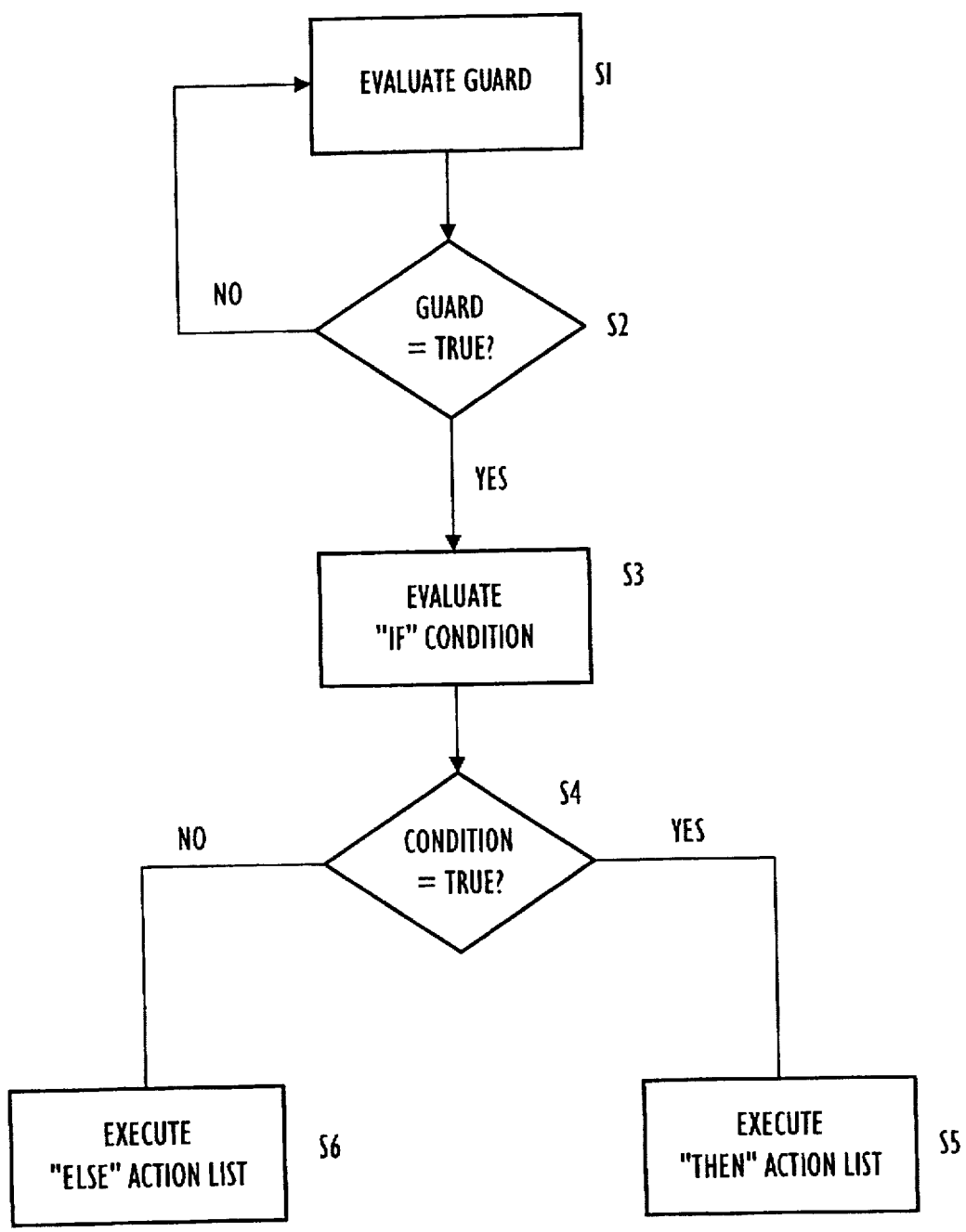
FIG. 4 illustrates a flow chart defining the process of interpretating a rule.

FIG. 4 illustrates the manner in which a rule is interpreted. Referring to FIG. 4, in step S1, the guard statement is evaluated. In step S2, if the guard statement evaluates to true, then the process proceeds to step S3 where the condition following the IF statement is evaluated. Otherwise, the process returns to step S1 to reevaluate the guard statement at a later time (e.g., upon the arrival of an updated check value). Following step S3, a determination is made (in step S4) as to whether the condition evaluated in step S2 equals "true." If so, then the action following the THEN statement is carried out in step S5. On the other hand, if the condition evaluates to "false" then the action following the ELSE statement is carried out in step S6.

The guard statements are logically separated from the conditions in the body of a rule in order to provide a meaningful interpretation of the "NEW" operator. Moreover, in order to optimize the process, the evaluation module keeps track of which check and state values are used in which guards and conditions, such that only upon the arrival of a new value are rules using that value considered.

According to the preferred embodiments, the following sets forth the possible guards, conditions and actions that are utilized in order for a system administrator to implement a dynamic monitoring system in accordance with the present invention.

The guards and conditions in a rule utilize the same formal language. The language includes, as an example, the following options:

a. reference to check values, including reference to "historic" values from a previous point of time.
b. "NEW" operator for check values; meaning that a new "measurement" for a watchdog check has arrived (same or different value as the previous value).
c. "CHANGED" operator for check values; meaning that a new "measurement" for watchdog check has arrived and the value is different from the previous value.
d. aggregation of check values, e.g., averages over a given interval.

13 e. reference to "state values" (states are like check values, but being et by actions of rules, not watchdog checks).

f. arithmetic and other operations on check and state values.

g. comparison operations.

h. boolean combinations of expressions.

In addition, the actions to be performed as the outcome of a watchdog rule contains at least one of the following operations to allow the dynamic monitoring system to realize its maximum potential:

a. execution of arbitrary commands on a given subsystem.

b. enabling and disabling of rules.

d. enabling and disabling of checks.

d. change scheduling of a check.

e. setting the state values.

There has thus been shown and described a novel architecture of a dynamic monitoring system which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A dynamic monitoring system for monitoring status and conditions of a computer system, said dynamic monitoring system comprising:

one or more watchdog checks, each defining a predetermined characteristic of said computer system to be monitored, and one or more watchdog rules, each defining a condition to be evaluated based on one or more of said watchdog checks;

a monitor, responsive to said watchdog checks, for monitoring the predetermined characteristics of said computer system, said monitor producing check values representative of the status of said predetermined characteristics of said computer system;

a rule evaluator, responsive to said one or more watchdog rules and at least one of said check values, for evaluating at least one of said watchdog rules based on said at least one check value and for producing an evaluation result; and altering means, responsive to said evaluation result, for dynamically altering said rule evaluator in real-time, by activating and suspending at least one of said watchdog rules and checks based on said evaluation result, to adapt said rule evaluator and said dynamic monitoring system to the status and conditions of said computer system.

2. A dynamic monitoring system as defined by claim 1, further comprising means, responsive to an output of said rule evaluation means, for implementing one or more predetermined processes as defined by said watchdog rules.

3. A dynamic monitoring system as defined by claim 1, further comprising a guard on one of said watchdog rules, wherein said guard defines predetermined conditions which must be satisfied in order for said watchdog rule to be considered.

4. A dynamic monitoring system for monitoring status and conditions of a computer system, said dynamic monitoring system comprising:

14 a plurality of watchdog checks, each defining a predetermined characteristic of said computer system to be monitored, and a plurality of watchdog rules, each defining a condition to be evaluated based on one or more of said watchdog checks, wherein a first monitoring group is constituted by a first predetermined number of watchdog checks and rules, and a second monitoring group is constituted by a second predetermined number of watchdog checks and rules; and a monitor, responsive to said first and second monitoring groups of watch dog checks and rules, said monitor monitoring said computer system in accordance with said first monitoring group, and producing first results representative of the status of said predetermined characteristics of said computer system, and said monitor, responsive to the first results, monitoring said computer system in accordance with said second monitoring group, when said first results indicate a first predetermined condition of said computer system, said monitor producing second results representative of the status of said computer system, and wherein said monitoring means further comprises means for activating and suspending at least one of said watchdog rules and checks, based on said first and second results.

5. A dynamic monitoring system as defined by claim 4, wherein said first monitoring group of watchdog checks and rules monitors general conditions of said computer system, and said second monitoring group of watchdog checks and rules monitors detailed conditions of said computer system. means indicated a second predetermined condition of said computer system.

6. A dynamic monitoring system as defined by claim 5, wherein a third monitoring group is constituted by a third predetermined number of watchdog checks and rules, said third set of watchdog checks and rules monitors conditions of said computer system more detailed than said second monitoring group, and wherein said monitor, responsive to said first and second results, further monitors said computer system in accordance with said third monitoring group of watchdog checks and rules to produce third results, when said first and second results indicate a second predetermined condition of said computer system.

7. A dynamic monitoring system as defined by claim 6, further comprising means for placing a guard on at least one of said watchdog rules, wherein said guard defines predetermined conditions which must be satisfied in order for said watchdog rule to be considered.

8. A dynamic monitoring system as defined by claim 6, wherein said first predetermined number equals at least one.

9. A dynamic monitoring system as defined by claim 6, wherein said second monitoring group is greater than one.

10. A dynamic monitoring system as defined by claim 6, wherein said third predetermined number is greater than each of said first and second predetermined numbers.

11. A dynamic monitoring system as defined by claim 6, wherein said third predetermined number is greater than said second predetermined number, and said second predetermined number is greater than said first predetermined number.

12. A method of dynamically monitoring a computer system, said method comprising the steps of:

defining a knowledge base including one or more watchdog checks, each defining a predetermined characteristic of said computer system to be monitored, and one or more watchdog rules, each defining a condition to be evaluated based on one or more of said watchdog checks;

monitoring said computer system in accordance with said knowledge base, and producing a result representative of a present status of said computer system;

dynamically reconfiguring said knowledge base in accordance with the status of said computer system, by activating and suspending at least one of said watchdog rules and checks based on said result, so as to adapt said dynamic monitoring system to the present status of said computer system; and monitoring said computer system in accordance with said reconfigured knowledge base.

13. A method of dynamically monitoring a computer system as defined by claim 12, wherein said step of dynamically reconfiguring said knowledge base is implemented in real-time.

14. A method of dynamically monitoring a computer system as defined by claim 13, wherein said knowledge base is divided into at least first and second groups of watchdog checks and watchdog rules, and wherein said first monitoring step comprises the steps of monitoring the computer system based on said first group of watchdog checks and rules, said step of dynamically reconfiguring said knowledge base comprising the steps of activating said second group of watchdog checks and rules, and suspending said first group of watchdog checks and rules, and said second monitoring step comprises the steps of monitoring said computer system based on said second group of watchdog checks and rules.

15. A method of dynamically monitoring a computer system as defined by claim 14, wherein said first group of watchdog checks and rules monitor general characteristics of said computer system, and said second group of watchdog checks and rules monitor detailed characteristics of said computer system.

16. A method of dynamically monitoring a computer system as defined by claim 14, wherein said second group includes more watchdog checks and rules than said first group.

17. A method of dynamically monitoring a computer system as defined. by claim 13, wherein said knowledge base is divided into a plurality of groups of watchdog checks and watchdog rules, including a general group of watchdog checks and rules and at least first and second specific groups of watchdog checks and rules, and wherein said first monitoring step comprises the steps of monitoring the computer system based on said general group of watchdog checks and rules; and said step of dynamically reconfiguring said knowledge base comprising the steps of activating one of said first and second specific group based on the results generated by said first monitoring step implementing said general group of said watchdog checks and rules.

18. A method of dynamically monitoring a computer system as defined by claim 17, wherein said general group of watchdog checks and rules monitor general characteristics of said computer system, and said first and second specific groups of watchdog checks and rules monitor specific characteristics of said computer system, said first specific group of watchdog checks and rules being defined to monitor a first problem of said computer system, as detected by said general group of watchdog checks and rules, and said second specific group of watchdog checks and rules being defined to monitor a second problem of said computer system, as detected by said general group of watchdog checks and rules.

* * * * *